United States Patent
Ishikawa et al.

(10) Patent No.: US 7,934,097 B1
(45) Date of Patent: *Apr. 26, 2011

(54) METHOD, APPARATUS, AND SYSTEM FOR MANAGING, REVIEWING, COMPARING AND DETECTING DATA ON A WIDE AREA NETWORK

(75) Inventors: Mark M. Ishikawa, Los Gatos, CA (US); Gregory A. Piccionelli, Los Angeles, CA (US)

(73) Assignee: BayTSP.com, Inc., Los Gatos, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 09/670,242

(22) Filed: Sep. 26, 2000

Related U.S. Application Data (60) Provisional application No. 60/156,479, filed on Sep. 28, 1999.

(51) Int. Cl.
*H04L 9/32* (2006.01)
*G06F 11/30* (2006.01)

(52) U.S. Cl. ............ 713/176; 713/187; 726/31; 726/32; 705/51; 705/57

(58) Field of Classification Search .................. 713/187; 705/51, 57
See application file for complete search history.

(56) References Cited

U.S. PATENT DOCUMENTS

| | | | | |
|---|---|---|---|---|
| 5,465,353 | A * | 11/1995 | Hull et al. | 707/5 |
| 5,647,058 | A * | 7/1997 | Agrawal et al. | 707/1 |
| 5,768,426 | A * | 6/1998 | Rhoads | 382/232 |
| 5,978,791 | A | 11/1999 | Farber et al. | |
| 6,246,803 | B1 * | 6/2001 | Gauch | 382/276 |
| 6,292,092 | B1 * | 9/2001 | Chow et al. | 340/5.6 |
| 6,415,280 | B1 | 7/2002 | Farber et al. | |
| 6,697,948 | B1 * | 2/2004 | Rabin et al. | 726/30 |
| 6,928,442 | B2 | 8/2005 | Farber et al. | |

FOREIGN PATENT DOCUMENTS

WO    WO 9515522 A1 *  6/1995

* cited by examiner

*Primary Examiner* — Benjamin E Lanier
(74) *Attorney, Agent, or Firm* — Osama Hussain, Esq.

(57) ABSTRACT

The disclosed embodiments are directed to a data management system, apparatus and process for uniquely identifying and protecting data. In preferred embodiments, the data management system comprises a data management server, a key generator, a source print generator and a source print detector. In some preferred embodiments, the data management system further comprises a data embedding system. Keys are created by the data management system for application to source files to create a fingerprint for the source file. The fingerprint is compared to unknown files to identify uses of the source file.

23 Claims, 5 Drawing Sheets

METHOD, APPARATUS, AND SYSTEM FOR MANAGING, REVIEWING, COMPARING AND DETECTING DATA ON A WIDE AREA NETWORK

RELATED APPLICATIONS

This application claims priority from provisional patent application Ser. No. 60/156,479 filed Sep. 28, 1999, entitled "Method, Apparatus And System For Managing, Reviewing, Comparing And Detecting Data On A Wide Area Network", which is fully incorporated herein by reference.

FIELD

The present disclosure is directed to a method, apparatus and system for managing, reviewing, comparing and detecting data on a network. More specifically, the data management system registers data into the management system and encrypts the data with retrievable information such that unauthorized uses of the data, including copies of the data, can be detected and restrictions on the use of the data can be identified. Further, the system is configured to provide notification to owners of data and other pertinent parties upon detection of use of the data.

BACKGROUND

The accessibility of information and data has exploded in recent years due, in part, to the increased popularity of online communication between users. In particular, currently used wide area networks, such as, for example, the World Wide Web ("WWW") or Internet, allow the exchange of enormous amounts of data between users without much regulation. Thus, a user in possession of particular data or information can, with relative ease, freely distribute the information to thousands, if not millions, of other users.

Although some of the distributed information is public information or information considered to be within the public domain, other information that is being distributed is not within the public domain, but rather, is privately owned. In these instances, the rights of the owners of this information is being violated. Indeed, the unauthorized distribution of materials, such as, photographs, music and articles, violates a variety of rights, including copyrights and trademark rights of the owners, such as, authors, songwriters and photographers.

Currently, if owners of material desire to know whether anyone is infringing upon their rights, a manual or visual comparison of the contents of every suspected or unknown file must be made. Comparing a source file to thousands or hundreds of thousands of files is an extremely difficult, if not impossible, task. Indeed, a review and search of a repository of files to ascertain whether any of the files are duplicates of protected material, in whole or in part, is currently a long, laborious, expensive, and often, imprecise process. Further, there is no method of knowing whether anyone else is researching, that is, comparing, the same sets of files. Thus, these monumental efforts may be duplicated unnecessarily.

In addition to the issue of protecting content or material, in some instances, distribution of some materials requires that mandatory information be associated with the file. For example, some federal statutes require that certain types of identifying information be associated with content files that are used on wide area computer networks, such as, the Internet. Association of the required information with a particular file can become cumbersome and impossible as the file is distributed from user to user. Indeed, the current holder of a copy of the file may not have any ability to comply with the requirements as they may not have received the file from the original owner of the file. Existing methods do not address the problem of handling this information.

In addition, in some instances, other types of information which may affect the use or distribution of the data, such as, licensing, or copyright information is also desirable to include within the file. In this manner, a prospective buyer of the file can ascertain a variety of information, including whether the person offering the file for sale is authorized to do so and thereby prevents fraud or misappropriation of the rights of others, including, intellectual property rights. Currently, no method exists that allows on-line access to pertinent information pertaining to restrictions on use or distribution of the data, or for any other purpose.

A need in the industry exists for a system that allows an owner of protectable material to locate unauthorized use and distribution of such material on a network, or even a stand alone computer. A further need exists for a system that allows users to ascertain use or distribution limitations, and to verify the rights of the distributor of such material such that potential users of the material are assured that they are purchasing or distributing authorized copies of the materials.

BRIEF DESCRIPTION OF THE DRAWINGS

The detailed description of the disclosed embodiments will be made with reference to the accompanying drawings, wherein like numerals designate corresponding parts in the figures.

SUMMARY OF THE DISCLOSURE

Embodiments of the present disclosure are directed to a data management system, apparatus and process for uniquely identifying and protecting data. In preferred embodiments, the data management system collects statistical samples from a source file to generate a unique identifier for the source file which can be used to searched for copies of the source file.

Preferred embodiments of the data management system comprise a data management server, a key generator, a source print generator and a source print detector. In some preferred embodiments, the data management system further comprises a data embedding system. A key or template is created by a data manager, wherein the key comprises a plurality of elements that define characteristics of the key. In preferred embodiments, multiple keys are created and stored in the data management system for use.

Upon the submission of a source file for registration, a key is chosen and submitted to the source print generator. The source print generator applies the key to the submitted source file, wherein portions of the source file that correspond to the elements contained within the key are recorded and stored in a source print file. The source print file and the source print are then stored in a database. In addition, in some embodiments, the source print file is stored in the source print detector.

The source print detector comprises a searching member and a comparison member that communicate with the data management server. The searching member searches networks and stand alone computers for unknown files. The searching member downloads the unknown files to the data management server. The comparison member compares the unknown files to all of the source print files that are stored in the system. Based upon the results of the comparison, a probability matching level is assigned to the unknown file. If there is a high probability that the unknown file matches a source print file, the source file associated with the source print file is visually compared to the unknown file to determine whether the files, or some portion of the files, match.

A feature of preferred embodiments of the disclosure is that a fingerprint is created for each data file and stored in association with a primary data file. An advantage to this feature is that each file can be uniquely identified. A further advantage to this feature is that the fingerprint for a specific file can be retrieved and compared against unknown or suspected files.

A further feature of preferred embodiments is that more than one key can be dynamically created for a given file and keys can be regenerated for a file. An advantage to this feature is that files that contain compromised or 'broken' key codes can still be protected. A further advantage is that file protection can be enhanced as key codes can be changed dynamically.

A further feature of embodiments of the disclosure is that the system can search and compare unknown files against the database of fingerprints. An advantage to this feature is that it allows the identification of a copy of the original file without performing a manual or visual inspection of the unknown files, thereby reducing labor costs and expense.

A feature of embodiments of the disclosure is that the data file can include indicia of ownership, licensing rights, copyright ownership and the like. An advantage to this feature is that by registering this information in a database in association with the file, the file is "branded" such that potential users of the file can readily identify if the file is in violation of any rights, thereby preventing potential legal problems incurred from the use of the file. A further advantage to the inclusion of this type of information is that it aids in the prevention of fraud or misappropriation of the rights of others, including, intellectual property rights.

A further feature of embodiments of this disclosure is that the indicia included in the file is registered or stored in a database that is associated with the file. An advantage to this feature is that the system can verify that users who are requesting information about the file are authorized or can readily verify other relevant information such as licensing information or ownership information.

A still further feature of preferred embodiments is that the system can identify data via fingerprinting without branding the data. An advantage to this feature is that owners can track any type of data whether any information is known about the data.

The above and other advantages of embodiments of this disclosure will be apparent from the following more detailed description when taken in conjunction with the accompanying drawings. It is intended that the above advantages can be achieved separately by different aspects of the disclosure and that additional advantages of this disclosure will involve various combinations of the above independent advantages such that synergistic benefits may be obtained from combined techniques.

DETAILED DESCRIPTION OF PREFERRED EMBODIMENTS

Embodiments of the instant disclosure are directed to a system, method and apparatus for managing, reviewing, comparing and detecting data on a network, such as, for example, the Internet or the WWW, wherein the data management system registers data that is input into the management system and encrypts the data with retrievable information such that uses of the data can be detected. Embodiments of the instant disclosure employ a network of computers and programs for comparing data and identifying uses of the registered data, as well as, allowing potential purchasers of the data to verify the rights of the distributor of such data.

Figure 1:
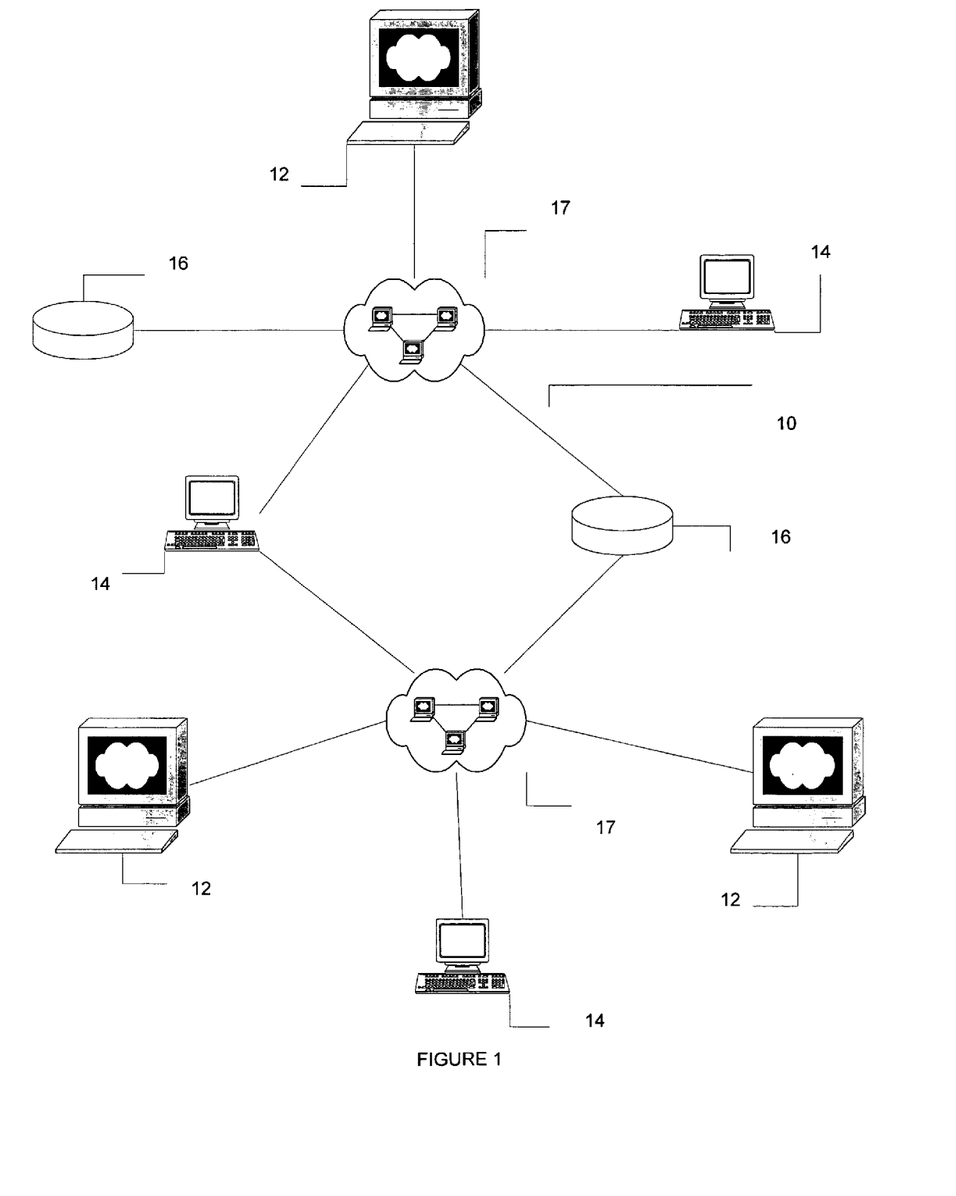
FIG. 1 is a network system environment in accordance with a preferred embodiment of the present disclosure.

Hardware Environment:

Preferred embodiments of the instant disclosure operate in concert with a plurality of networked computers, such as, for example, a user computer and a server computer which are coupled together on a communications network, such as, for example, the Internet or a wide area network. FIG. 1 depicts a network system 10 that operates in accordance with preferred 30 embodiments of the disclosure. In preferred embodiments, the network system 10 includes a server 12, or a provider computer, a client, or user computer 14, and a data management server 16, wherein the server computer 12, the user computer 14 and the data management server 16 are in electronic communication with each other via a communication link 17.

In some preferred embodiments, the network system 10 includes a plurality of either the server computer 12, the user computer 14, or any combination thereof. The server computer 12 contains a variety of data that is accessible by the user computer 14 or clients. The network 10 includes one or more (and preferably a plurality of) servers 12 that are operatively connected to the communication link 17. Two such servers 12 are shown in FIG. 1. It will be understood that network systems in accordance with further embodiments may include more than two servers 12, and in most instances, more than one user computer.

In some preferred embodiments, the data management server 16 contains a repository of registered data that is accessible to authorized users. The data management server 16 comprises a programmable processor capable of operating in accordance with programs stored on one or more computer readable media to interact and communicate with the server computers 12 and the user computers 14 to retrieve data and provide information regarding the registered data resident on the data management server 16. The data management server 16 may comprise, for example, but not limited to, a personal computer, a mainframe computer, network computer, portable computer, personal digital assistant (such as, a 3Com Palm Pilot), or the like. In still other preferred embodiments, a plurality of data management servers 16 are included within the network, wherein the plurality of data management servers 16 communicate with each other, the provider computers 12 and user computers 14 via communications links 17.

The provider computer 12, or server, may comprise any suitable network device capable of providing content (data representing text, hypertext, photographs, graphics video and/or audio) for communication over the network. In preferred embodiments, the provider computer 12 comprises a programmable processor capable of operating in accordance with programs stored on one or more computer readable media to provide content for communication to a user computer 14. The provider computer 12 may comprise, for example, but not limited to, a personal computer, a mainframe computer, network computer, portable computer, personal digital assistant (such as, a 3Com Palm Pilot), or the like.

In a preferred wide area network environment, such as, the Internet environment, the provider computer 12 is controlled by suitable software to respond to a valid request for content by providing (or downloading) data in the form of one or more HTML files to the user computer 14 from which the request was made. It will be understood by those skilled in the art that this process involves communications through suitable servers, routers and other components, as is dictated by the particular network environment. The communication link 17 may include a public network, such as the Internet, a local area network, or any other suitable communications connection, hardwired, wireless, or a hybrid thereof.

The user computer 14 may comprise any suitable network device capable of communicating with other network devices in the network system. In preferred embodiments, the user computer comprises a programmable processor, a display device, and a user input device. In one preferred embodiment, the user computer comprises a personal computer system having a CRT display, a keyboard and a mouse user-input device.

The user computer 14 is controlled by suitable software, including network communication and browser software to allow a user to request, receive and display information (or content) from or through a provider computer 12 on the network system 10. The user computers 14 are any means capable of communicating with the server computers 12, and the data management server 16 including, but not limited, to personal computers, stand alone media including hard drives, CD ROMs, DVD Roms, kiosks and ATM-type machines. The user computers 14 access the server computers 12 via the wide area network or through some other remote access, such as, for example, by telephone, facsimile, personal digital assistant, pulse code system, web TV, or any other device or method the communicates alpha numeric data with a server.

General Description of Preferred Embodiments

Figure 2:
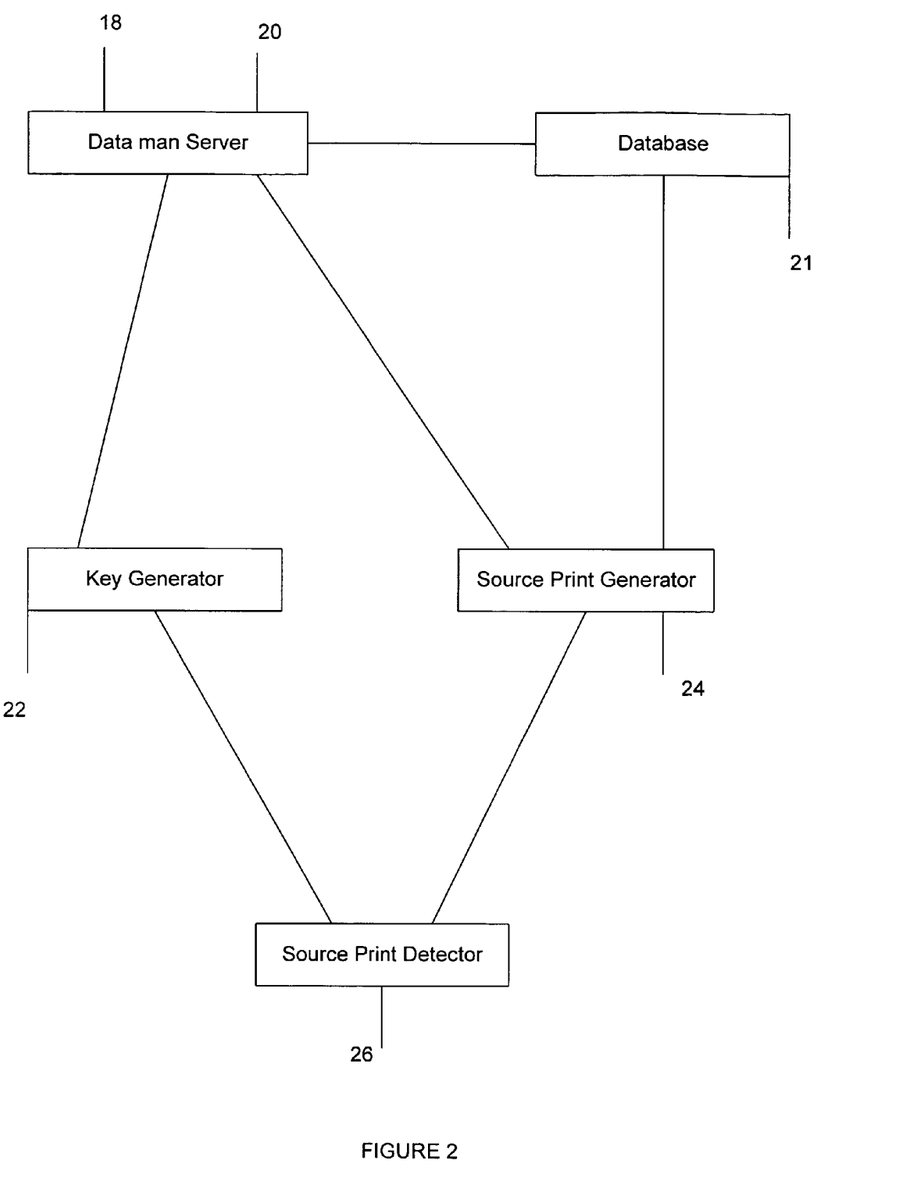
FIG. 2 is a block schematic of a representation of a data management system in accordance with preferred embodiment of the present disclosure.

Embodiments of the present disclosure are directed to a data management system, apparatus and process for uniquely identifying and protecting data, in particular, by using a collection of statistical samples from a source file to generate a unique identifier for the source file which can be searched for in unknown files. With reference to FIG. 2, preferred embodiments of the data management system 18 comprises a data management server 20, a storage database 21, a key generator 22, a source print generator 24 and a source print detector 26. In some preferred embodiments, the data management system 18 further comprises a data embedding system 28.

The data management server 20 comprises any suitable network device capable of receiving and storing content (data representing text, hypertext, photographs, graphics video and/or audio) over a network. The data management server 20 controls and directs the operation of the data management system 18, namely, directing the registration, retrieval and analysis of data. The data management server 20 accepts data from content owners for registration and contains a repository of registered data that is accessible to authorized users.

The data management server 20 comprises a programmable processor capable of operating in accordance with programs stored on one or more computer readable media to interact and communicate with the server computers 12 and the user computers 14 to retrieve data and provide information regarding the registered data resident on the primary server. In one preferred embodiment, the data management server 20 operates in conjunction with a plurality of servers (discussed below) to retrieve and analyze data; however, it is to be understood that all of the functions and operations of the data management system 18 can be performed by the data management server. The data management server 20 may comprise, for example, but is not limited to, a personal computer, a mainframe computer, network computer, and a portable computer.

The storage database 21 is a storage medium that is capable of storing source data and information related to the source data. The storage database 21 can be a stand alone media or contained within the data management server 20.

The key generator 22 resides on the data management server 20 and accepts input from a system manager for defining and generating a data identifier or key. The key generator 22 can be a text editor, a database manipulation tool or any other suitable tool for accepting input from the system manager for defining the particular key. In preferred embodiments, a set of keys are predefined such that as data is entered into the system a key can be assigned to the incoming data.

Figure 3:
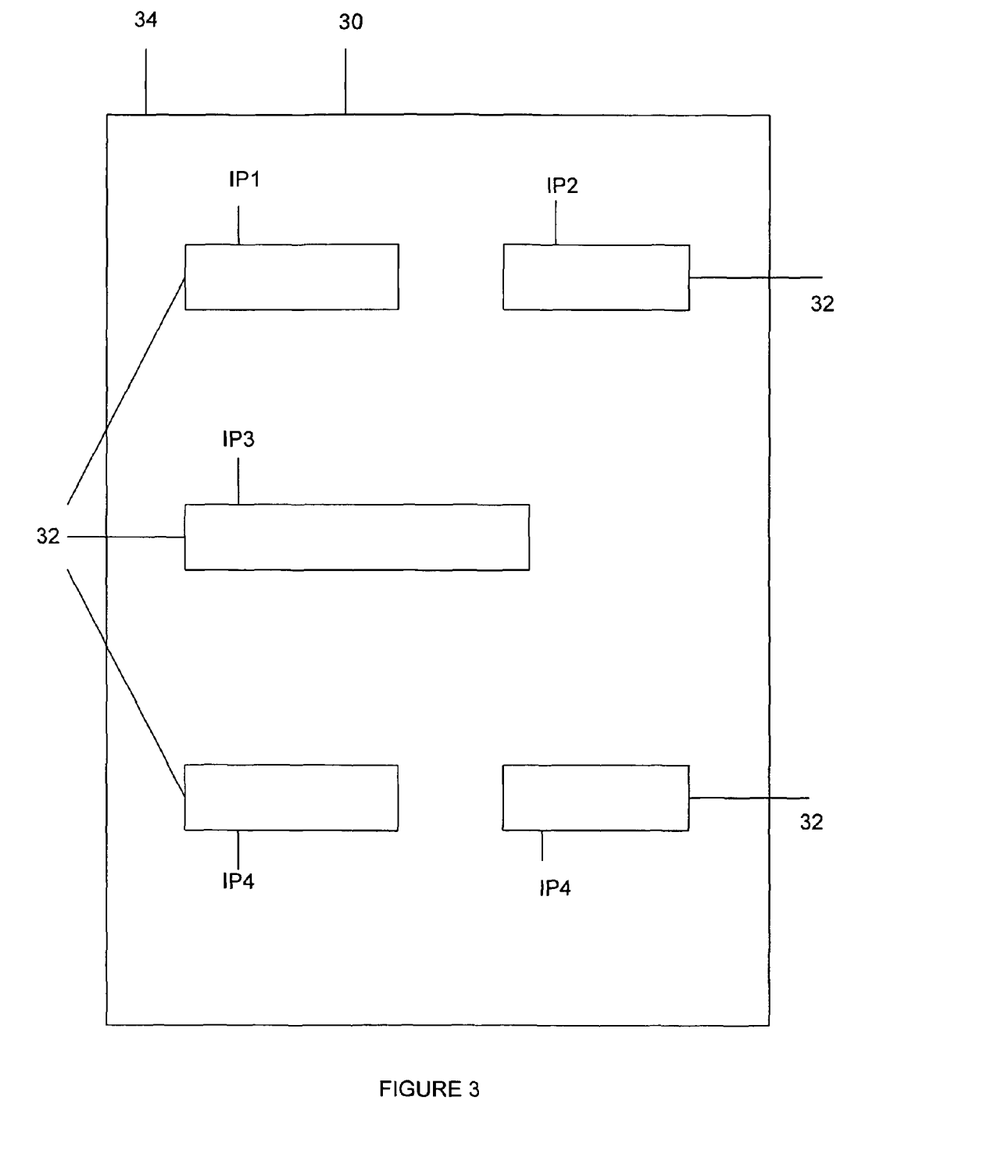
FIG. 3 is a representation of a key template in accordance with preferred embodiments of the present disclosure.

With reference to FIG. 3, the key 30, or file identifier, is a template that comprises a set or a plurality of elements 32, wherein the set of elements defines the key. The key elements 32 are defined by a plurality of parameters or qualifiers, wherein the qualifiers define the characteristics of the key. In preferred embodiments, the qualifiers include, but are not limited to, quantity, element size, start position and initial position of the element. In some preferred embodiments, a set of rules are also defined and associated with the key 30, whereby the data manager can include special rules for particular files or data.

The parameters for the key are input into the data management server 20 by the data manager. The parameters are input into a data management screen that accepts the number of elements, position of elements, type of elements and length of each element. Prior to defining the individual elements within the key, the data manager determines the size of the key. The size of the key is determined, in part, by the data size, the desired quantity of elements and the element sizes. In many instances, the data manager is unaware of the size of the data content, and thus, bases the size of the key on average file sizes.

The quantity qualifier, Q, defines the number of elements to be recorded from the source file. In one preferred embodiment, the key includes 100 elements. For each element, the data manager defines the element size S, wherein the element size defines the length and width of each recorded element, that is, the number of data bits or bytes. In preferred embodiments, the size of each element is the same, however, in some embodiment each element differs in size such that the sampled elements vary in length. In one preferred embodiment, for graphical type files the element size is a matrix of 10×10 pixels. Thus, for example, a first element of a matrix of 10×10 pixels for an image file would be defined as S1:100 bytes or S1:(10,10).

As the key will be a subset of the size of the source file, a determination must be made as to where to commence the application of the key, otherwise a different source print, or fingerprint, might be created for the same source file. Thus, the start position 34 defines the position from which the commencement of recording the key 30 begins. For instance, the start position 34 can be defined as the physical beginning of the file, a predefined bit, programmable logical delineations, such as, an index frame, or the logical beginning of the file, such as, the position subsequent to header information or other variable type information. In this manner, application of a key 30 to the same source file will always create exact copies of the fingerprint.

The type of element identifies the nature of the information in the key element. The type of element can include, but is not limited to, bits, bytes, file segments and paragraphs, although any identifiable type of element is suitable.

In addition to the quantity Q, element size S, and start position 34, the initial position IP of each element 32 is defined, wherein the position of each element is the location from which the initial point in each element is to be recorded. In preferred embodiments, the initial position of each element 32 is defined relative to the defined starting position 34 of the key. For instance, and with reference to FIG. 3, the initial position IP1 for the first element is defined as the "start position 34 plus x". Similarly, the initial position IP2 for second element is defined as the "start position 34 plus y".

Although the above defined parameters can uniquely identify a key, in some instances, it is desirable to apply the key differently to different files or in different situations. In this regard, a set of rules, or special instructions are stored with the key, wherein the rules can be virtually any type of instruction. For instance, a set of rules may include 'ignore every $5^{th}$ byte of a data file' or 'if a file type is a .jpg then commence sampling at byte position 1500'.

Once a key, or a set of keys is defined, the keys are applied to source files submitted to the data management system 18. It is to be understood that keys can be added and removed at any time, thus, the set of usable keys is not stagnant. The ability to change the set of keys that are used to create fingerprints of source files increases the security for the source file owners as it is more difficult for unscrupulous users of the source files to hide the unauthorized use of the source file.

To create a source print, or fingerprint, the source file is submitted to the data management and tracking system, wherein the source print generator 24 applies a preselected key to the source file. The choice of the key, depends in part, upon the size of the source file.

The source print generator 24 is a program that extracts the key elements defined in the key. In preferred embodiments at least two methods of extracting key elements is utilized by the system; namely, a compression specific method and a non-compression specific method. Data for extracting the key elements for either the compression specific method or the non-compression specific method are contained within the data file and the applied method is determined by the system. In general, the compression specific method allows for faster preparation of the keys as it is a copying of the data information that exists within the files. In one preferred embodiment, both methods are applied to incoming data so that fingerprints for both types of information are stored.

The compression specific method is typically applied to data in a compressed format. In accordance with the compression specific method, the bit sequences corresponding to the key elements are extracted from the source file utilizing the rules, sizes and positions specified in the key. The source print generator 24 builds a concatenated string of all of the elements, wherein the resulting string of data bits is the 'file fingerprint'. A unique file identifier is assigned to the source data and associated with the fingerprint such that the file fingerprint can be identified with the original source file. The file fingerprint is then saved in the database 21. This method can be applied to any type of file, including, but not limited to, video, text and video files, wherein for video files only the index frame, that is, the full frame is reviewed in creating the fingerprint.

To apply the non-compression specific method the compressed data file is expanded into the system's memory. As is commonly understood, each pixel comprises three colors, namely, red, green and blue. Once expanded, the values for each of the colors in each pixel can be accessed. In accordance with the non-compression specific method, an average value for each color, red, green and blue is calculated for each element. In this manner, a set of three numbers (RGB) is stored for each element. The sets of numbers for each element creates the 'file fingerprint'. This method can be applied to any type of file, including, but not limited to, audio, text and video files, wherein for video files only the index frame, that is, the full frame is reviewed in creating the fingerprint.

Prior to the extraction of the data for the key elements, the data is normalized. Although any normalization method may be suitable, the type of normalization applied can vary depending, in part, upon the type of file. For instance, for text files, the data is normalized by removing all spaces and formatting characters such that only a string of text is left in the file. For audio files, the volume is preset to a standard volume. In one embodiment, the volume is set to zero db. Next, the sampling rate of the source audio file is determined. Once the sampling rate of the original file is determined, the system's sampling rate is adjusted so that it matches the sampling rate of the original file, wherein the sampling rate of the original file is the sampling rate that generated the fingerprint. Values for various parameters, such as, tonal quality, frequency and pitch are recorded and a series of averages are determined for given time periods. With respect to video files, the audio portion is separated from the video portion. The color and brightness, or screen intensity, is set to neutral, or a zero value.

It is to be understood that multiple fingerprints can be created for a single file as a "repeat" command can be designated such that the key is applied until the end of the file is reached. In this instance multiple fingerprints are stored in association with the source file. Further, it is to be understood that already registered files can have new keys reapplied such that a new fingerprint can be created for the source file. This provides greater security for the source files as unscrupulous users could not be certain as to how to alter the copied source file so as to avoid the fingerprint.

Once a file fingerprint is generated, or a set of file fingerprints is generated, copies of the source file, both authorized and unauthorized, can be detected. In preferred embodiments, the source detector 26 comprises a search member 36 and a comparison member 38.

Figure 4:
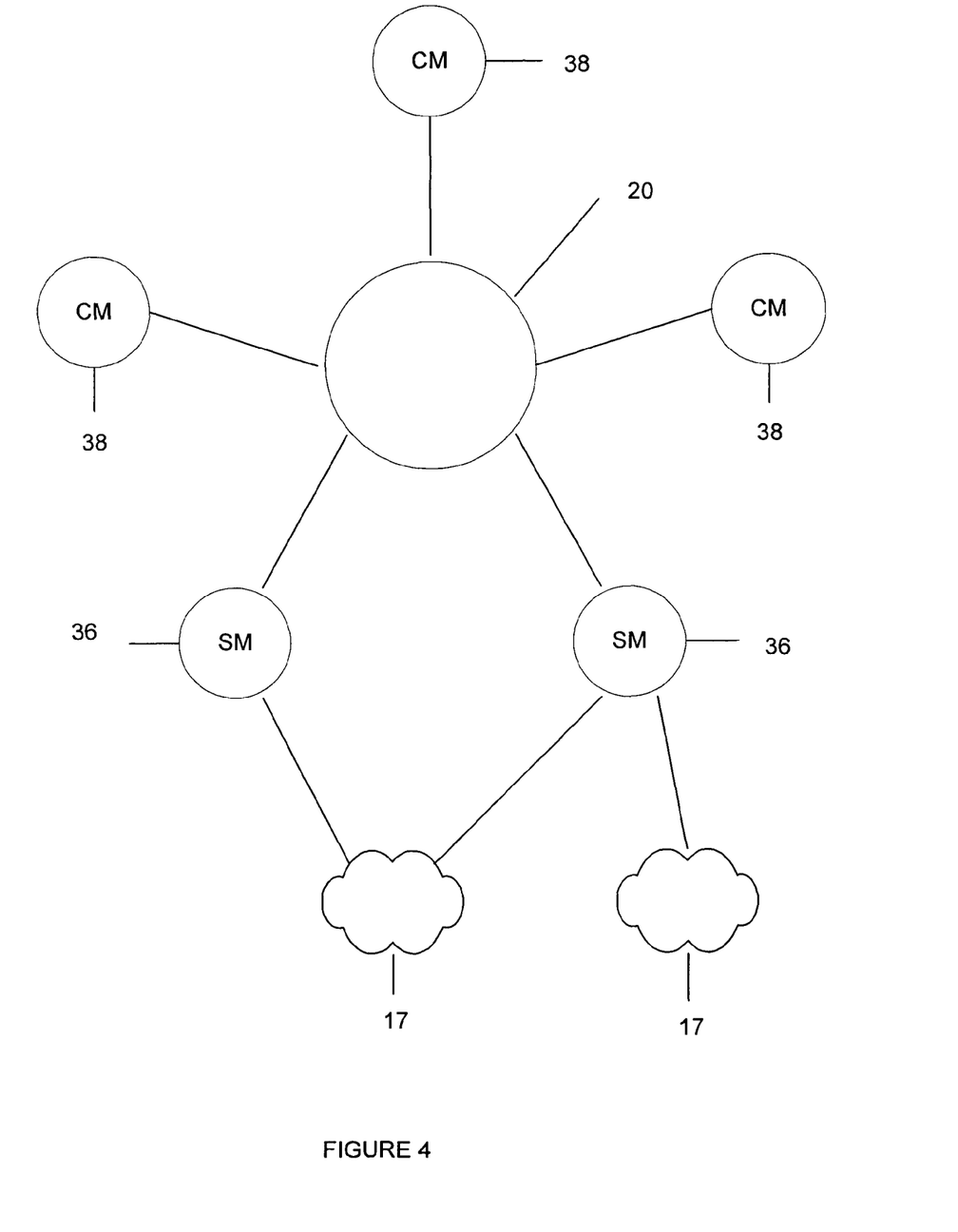
FIG. 4 is a representation of the source detector having a data management server, a plurality of search members and a plurality of comparison members in accordance with a preferred embodiment of the present disclosure.

With reference to FIG. 4, the search member 36 comprises a computer that operates in conjunction with a software program that searches networks or stand alone computers for files potentially contained in the data management database. In preferred embodiments, the search member 36 searches web sites on networks for files. To commence the search, the data manager or operator provides a "seed" to the search member 36. The seed is typically a searching start point, such as, a domain name or a word. Thus, the seeds can target specific areas of interest, such as, music. For instance, the seed can be "music.com" or simply "music".

In addition, the search member 36 'follows' each of the hypertext links or connections on each web page and downloads files found on each of the web pages to the data management server 20. The search member 36 continues to search until it can no longer reach a new set of files to retrieve, for example, it reaches a web page with no new links. At this time, the search member 36 requests a new seed and begins a new search. It is to be understood that in preferred embodiments, multiple search members can be utilized simultaneously to increase the speed with which results can be obtained for one search, or to allow multiple searches to occur at one time. In this manner, entire networks, for example, the WWW, can be spidered or searched for uses of the source file. Further, to limit the search, limiting words can be included to more accurately direct the search. For instance, the seed plus a "word limitation" can be defined, wherein the search ceases if the "word limitation" is not found within a certain number of connections or links.

Once the search member 36 has located a file, that is, the target file, the comparison member 38 commences a comparison of the target file with the fingerprint associated with the source file that is being searched. The comparison member 38 comprises a computer that operates in conjunction with a software program that is capable of comparing the contents of data files and generating a probability matching level. In preferred embodiments, the comparison member 38 has a set of fingerprint keys stored in memory. In some preferred embodiments, the fingerprint keys are transferred to the comparison member 38 just prior to the commencement of file comparison. In other preferred embodiments, the comparison member accesses the database 21 containing the fingerprints.

To review and compare the downloaded files, the comparison member 38 communicates with the data management server 20 and begins a review of the downloaded files. The downloaded files on the data management server 20 are compared against each of the fingerprint keys stored in the comparison member 38. The comparison member 38 searches the contents of the target file for the existence or occurrence of each of the fingerprint elements from the fingerprint in accordance with the parameters that define each element in the fingerprint key. In one preferred embodiment, a comparison is made of smaller element sizes against the predetermined set of elements in the associated fingerprint key. If multiple fingerprints exist for one source file, the key is applied for each separate fingerprint to the target file, or until the end of the target file is reached. In some preferred embodiments, a plurality of comparison members are utilized. In these instances, each of the comparison members have a unique set of keys. During comparison of the downloaded files, each of the individual comparison members compares its set of keys against the downloaded files on the data management server.

The results of this comparison are stored in a database or table. Once the comparison is complete, the comparison member 38 compares the database or table to the fingerprint of the source file, wherein the comparison is based on the existence of each element, the order of each element and the relative position in the file and to each other.

If all of the fingerprint elements are present in the table and the elements are present in the relative positions of those in the fingerprint, the target file has a high probability of being an exact match with the source file. In this instance, a 100% matching probability score is assigned.

If however, the comparison reveals that fewer than all of the fingerprint elements are present, or the relative positions of each of the present elements differ than the elements in the fingerprint, a lower matching probability score is assigned. For instance, a fingerprint key having nine elements is compared with a target file wherein nine of the ten elements are found and the positions of the nine elements match the positions of the corresponding elements in the key. In this instance, a 90% matching probability score will be assigned. Similarly, if all ten elements in the key are found in the target file, but the relative positions of these elements do not match, a matching probability of less than 100% would be assigned. In preferred embodiments, the matching probability score algorithm is defined by the data manager, however, in some embodiments, the user, for example, the source file owner, can define the matching probability score algorithm. In any instance, the owner of the source file predetermines the level of tolerance of the probability score. The level of tolerance can be defined in any manner, including, but not limited to, the number of exact element matches, the number of contiguous fingerprint element matches, and the value of each bit in the elements for compressed data, and a degree of tolerable variation in the average value for each element if the file is being viewed as non-compressed specific data. If the probability score of a particular target file falls below the threshold the owner of the source file is not notified.

The data embedding system 28 comprises a data block, an encryption key, and a user decryption key. In preferred embodiments, the data block is a set of user defined information that is encrypted, in whole or in part, utilizing an algorithm assigned to an authorized user and embedded into the data file. In some instances, some of the information is encrypted such that only authorized users can review the data. In still other instances, a mixture of encrypted and non-encrypted data is embedded in the file such that certain portions of the information is available to any user reviewing the file.

In preferred embodiments, the data block includes information pertaining to intellectual property rights, such as, copyrights, trademarks, and licensing agreements. Additionally, information pertaining to mandatory compliance information, such as, 18 U.S.C. §2257, can be included in the data block. Still other information that can be in the data block includes, but is not limited to, Digital Millenium compliance information, authorized user lists, authorized web site lists, key words, user defined attributes of the source data, file descriptive data, and file information, such as, content owner. As discussed above, this type of information can also be stored in the database associated with the source file.

The inclusion of this type of information directly in the file is beneficial in that it aids in the prevention of fraud or misappropriation of the rights of others, including, intellectual property rights. By storing this information in the data block which is subsequently embedded in the data file, the file is "branded" such that potential users of the file can readily identify if the file is in violation of any rights, thereby preventing potential legal problems incurred from the use of the file. The registration of this information in the database in association with the file allows the data block to be restored or a file to be identified in the event that the encrypted block is destroyed or removed from the file.

The information in the data block is encrypted via the encryption key. The encryption key is a user definable algorithm that allows the file owner to secure the information contained in the file data block. The algorithm allows the file owner to generate a user decryption key.

The user decryption key is a string of data that unlocks selected or specific data files and information contained within the data block. In some embodiments, the user decryption key limits the amount of time that the information is unlocked. Generally, a user decryption key will be defined for a specific user, for example, a specific licensee.

Figure 5:
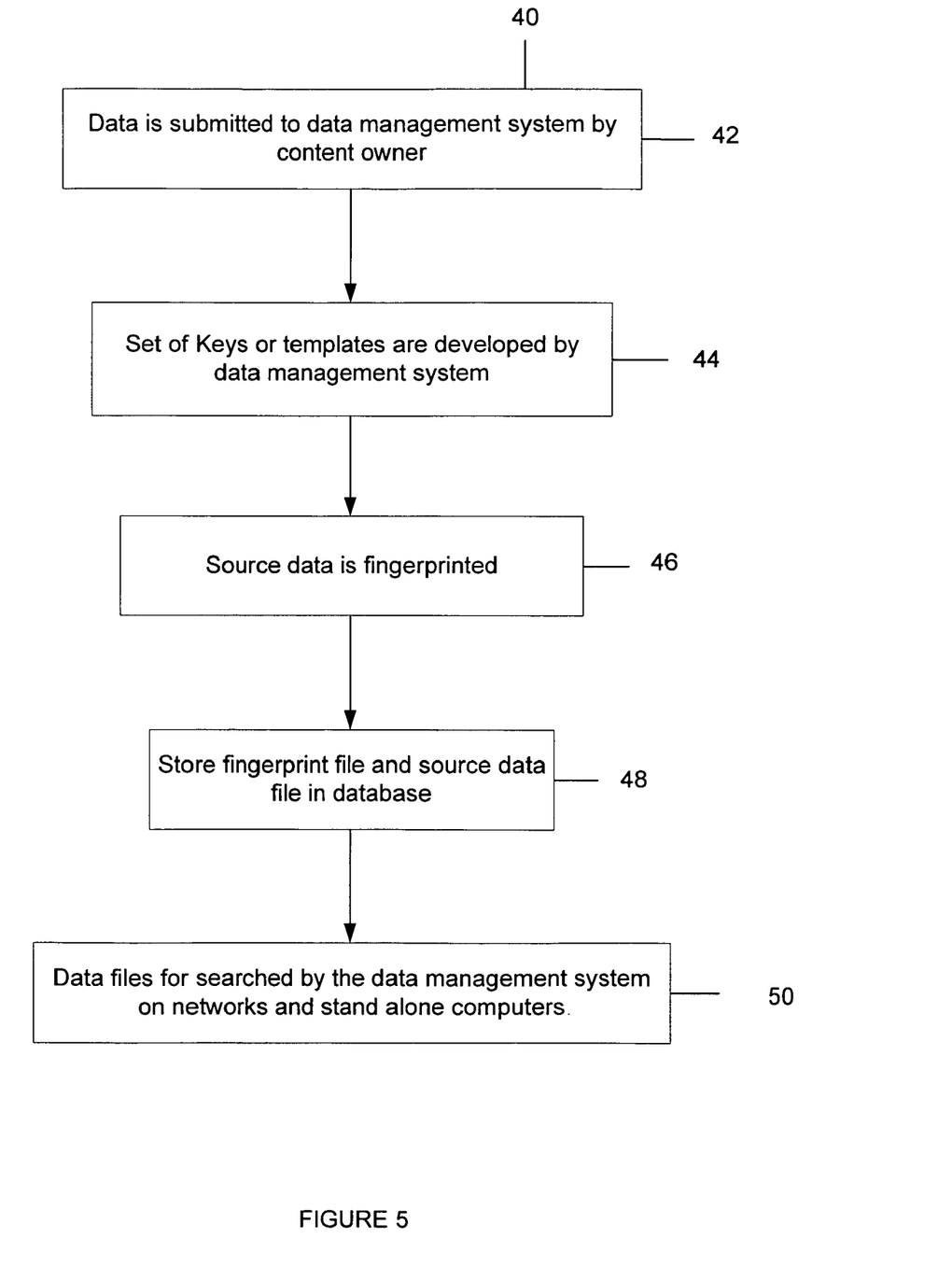
FIG. 5 is a block diagram of a data management process in accordance with a preferred embodiment of the present disclosure.

As discussed above, the data management and tracking system is operated by a system manager that collects and stores a repository of original data or source files from the owner of the in source files, wherein the data manager is a person or entity that manages information pertaining to the collected group of data files. With reference to FIG. 5, embodiments of the data management process 40 comprises receiving content files from content owners or providers 42, creating a key or mask 44, creating a fingerprint for the file 46, storing of the submitted content in a database 48, and comparing unknown content files to the content stored in the database 50.

Content is received into the data management system 18 from content providers, content owners, or other users desiring to track usage of the data files. A content owner or authorized user provides the original source file to the data management system 18 for registration and storage. At the time of the content submission, content owner indicates the services or type of protection desired for the source file. In addition, the owner designates the threshold tolerance level (discussed above), that is, the percentage of matching between the source file and an unknown file, which triggers examination of the unknown file. Finally, the owner provides a mailing address, email address, or some other manner of contacting the owner. It is to be understood that other types of data can also be included, and the above references are not intended to be limiting.

In general, the content owners are photographers, musicians, authors, artists, and the like, and the type of data submitted to the system includes, but is not limited to, image files, audio/video files, text or graphics. It is to be understood that any type of data can be collected and managed by the data management system 18.

The collected source files are stored in a database in conjunction with various identification means, including, but not limited to, a unique file identifier, a fingerprint, file size, filename and name of file owner. As stated above, a wide variety of the types of source protection is available to the owner, including, but not limited to, license violations, trademark and copyright infringements. In these instances, information, such as, licensees of the file, licensees of trademarks or copyrights found in the file, are included in the database. In addition to file identification information, the database also includes other types of information relevant to the file, including, but not limited to, the type of source protection that the owner is seeking and the information relevant to that protection. For instance, if the file is licensed, the specific sites to which the file is licensed are identified. Additionally, any trademarks that have been licensed by the content owner, or that are owned by the content owner, can be identified in the database for purposes of determining whether any unknown data files contain infringing uses of the identified trademarks exist.

Once the data is received from an owner, a unique identifier, or source print, is created for the data. Prior to creating the source print for each source file, a key, or a set of keys, are defined by the system manager, wherein the key is a template from which corresponding portions in the source file will be recorded. As described above, the key comprises a set of elements that are defined by a plurality of parameters, wherein for each key, the set of elements and the parameters defining the elements differ. In this manner, an unlimited number of unique identifiers, or keys, can be defined for use. Indeed, different keys can be defined for different sets of data files.

As the source files are collected by the data manager, the source print, or fingerprint, is created for each file. The fingerprint is created by applying a predefined key to the source file, namely, by recording the information in the source file which corresponds to the set of elements defined by the key. Once the fingerprint is created, it is stored in the database 21 as another indicia of source file identification. A key identification is further associated with the source file and the fingerprint, such that the key which generated the fingerprint can be identified.

To protect the source file from unauthorized distribution and use, the management system utilizes the source print associated with the specific source file to locate and identify uses of the source file. The management system compares all target files, that is, unknown or suspected files, with the source print. If a 'match' occurs, wherein a match is predefined by the system manager, a visual or manual comparison is made between the suspected file and the original source file. If the files are identical, or substantially identical, the target file and its location is recorded for future reference and notification to the owner of the original source file.

In addition to registering and searching for uses of source files, the data management process 40 further comprises branding a file. In one embodiment, at the time that an owner submits a file for registration and fingerprinting with the data management system 18, the owner can also submit a user defined data block. As discussed above, the information contained in the data block can be rights information, licensing information, a counter, key words, user defined attributes and mandatory compliance information.

Upon the submission of the file and data block information, the data management system 18 examines the file contents for existing branding information. If no existing branding information exists, the system performs a file comparison process to verify whether the file currently exists in the system. If the file does not exist within the system, the unique identifier, or fingerprint, is created for the file. Both the file contents and the associated file fingerprint are stored in the database.

Once a fingerprint is created for the source file, the management system builds a concatenated string from the data block information. This concatenated string is stored in the database in association with the source file information. The owner is then notified of the completion of the task.

In addition to the file type information, an owner can also brand the file for 'use' rights. In this instance, an owner submits the unique file identifier, licensing parameters, and a user decryption key for the particular user that is receiving the data. The management system verifies that the requestor of the branding has the rights to request the branding of the file. If the submitting party does not have sufficient rights to brand the file, the branding is rejected and the file owner is notified of the attempted branding.

If the submitting party, for example, the owner, has sufficient rights to request the branding, the file data block is encrypted utilizing the key assigned to the file licensee. The encrypted data block is then embedded into the file. Upon completion of the embedding of the data block, a file fingerprint is created and stored. The resulting branded file is then returned to the submitting party for distribution to the licensee.

If a user attempts to brand a file, if branding information already exists, the system verifies that the submitting user is allowed to re-brand the file. If the submitting party is not entitled to re-brand the file, the branding is rejected and the owner of the file is notified of the attempt. In this manner, the owner of the file is alerted to potentially unscrupulous activity of a licensee or unauthorized user.

The branding of the files allows the system to automatically verify that the requestor of the file is an authorized user, or if the requestor falls within the ambit of a licensing agreement. Further, the branding allows potential licensees of a particular file to view portions of the file via a browser plug-in. In this manner, the potential user of the file can be assured that the distributor of the file is authorized and that the use of the file is legal.

Uses of the data management system 18 extend beyond detecting uses of a file and verifying authorization to use the file. Indeed, the system allows users to determine, for example, whether a file exists in the system, limitations of use of the data, and verification of compliance with various laws. For example, a user desires to determine whether 'File A', an unknown file, exists in a repository of 1000 known files. Fingerprints have been previously generated and stored for files resident in the repository.

To commence the search for File A, a fingerprint will be generated for File A. The fingerprint of File A is then compared to all of the known fingerprints in the repository. If an exact match is found, that is, if all of the elements having the same relative positions are found, a high probability exists that File A is contained within the repository. If an exact match is not found, files having high matching probability scores are identified. All files having a matching probability score that is equal to, or greater than, a predetermined matching probability tolerance level preset by the user, are displayed for manual or visual comparison.

To verify use rights, a user that is contemplating or has licensed a file submits the file to the data management system 18 for comparison or to review restrictions of use pertaining to the file. The file is scanned and compared to the database to determine whether this unknown file is contained within the database. If the file is found in the database, a determination is made as to whether any violations of the file exist. If the file is found to be in violation of the content owners rights, or someone else's rights, for example, a trademark infringement, the data management provider will notify the content owner of such violation by the means that they have specified. In some preferred embodiments, further notification is automatically provided to predesignated parties, such as, governmental agencies, copyright owners, legal representatives, ISPs, webmasters and the like. Further, in some embodiments, the system is capable of tracking continued violations of the data and the resolutions of the violations. If however, the file is not found to be in violation of any rights, the resulting search information will be returned to the submitting user by the means that they have specified.

In operation, a content or data owner submits a collection of data files the data management system. The system assigns each data file a unique file identifier. A key is chosen and fingerprints are generated for each data file. The fingerprint and other relevant information, for example, file identifier and key identifier are stored in the database in association with the source data file.

When the data owner desires to license or otherwise authorize use of the data files, the owner submits relevant information for the creation of a data block that will be encrypted into the file, including a unique decryption key that is associated with the authorized user of the file. The data file containing the encrypted data block is delivered to the user for use, along with a plug-in program and pin number for access to the data block and files. The source data file can now be searched via the fingerprint or verified for authorized use via the data block.

The following examples illustrate other implementations of the data management system 18 and its use. These examples are intended to be illustrative and are not intended to be limiting, but rather, illustrate the wide breadth of use and application of the disclosed embodiments.

Examples

Licensing restrictions: A licensee purchases the right to use an image on 20 web sites. The file owner of the image submits the unique file identifier, licensing information and an encryption/decryption key set to the data management system. The data management system verifies that the branding requested is within the file licensing rights. If the branding requested is outside of the licensing rights, the branding is rejected and the file owner is notified of such rejection. If the branding is within the file licensing rights the file data block is encrypted using the file licensee's encryption/decryption key as provided by the file owner. The encrypted data block contains, for example, a "20 times right use" license and file details are embedded in the licensed file. A fingerprint of the licensed file is taken and stored in the data management system's database. A copy of the licensed file, which includes the encrypted data block and file contents, is returned to the file owner for distribution to the licensee.

Compliance regulations: A law enforcement officer desires to verify that a file is compliant with 18 U.S.C. §2257 notification requirements. This regulation is directed to photographs of models and requires that the following information be supplied in conjunction with the photograph: a listing of the custodian of records (who has the original file) and two forms of identification of the model. Verification of this information can be accomplished by at least two methods.

1. The law enforcement officer can utilize a web browser plug in, that is a program written to use the decryption process defined above, select the image and execute the decryption program from within a web browser. The decryption program will examine the selected file looking for an encrypted data block. If an encrypted data block is found, the program will apply the encryption/decryption key, which has been generated by the file owner for the law enforcement officer. The decryption key decrypts the specified fields and allows the officer to obtain pertinent information required to access the compliance data. In one embodiment, the pertinent information is the unique file identifier and a subject matter identifier. Upon application of the encryption key, the file and subject matter identifiers are decrypted and automatically transferred to the system. The system responds and displays all the information which the user is allowed to view, namely, in this instance, the file's §2257 compliance data. If an encrypted data block is not found within the file, then the §2257 compliance information is not embedded in the file and therefore cannot be displayed.

2. The law enforcement officer can download the image to his computer and submit the file to a stand alone decryption program. The decryption program examines the selected file looking for an encrypted data block. If an encrypted data block is found, the program applies the encryption/decryption key to the data block, which causes the system to display the compliance data. If an encrypted data block is not found in the file, then the §2257 compliance information is not embedded in the file and therefore cannot be displayed. In these instances, the file must be submitted to the system for a comparison against the database 21 and/or fingerprints to ascertain the desired information.

Copyright Violations: A content owner, for example, an owner of photographs or writings, submits a copy of the data to the data management system. The system registers the data. If desired, the content owner can request that the data be automatically registered with predesignated parties, such as, the Copyright Office. Once the data is registered, the system searches the WWW, other designated networks, or computers, and identifies uses of the data. As unauthorized use of the data is identified, the system sends an automatic notification of the violation to predesignated parties, including, the content owner, and the infringer. The system then automatically monitors the infringing use of the content until it is removed. In some embodiments, the system further notifies the content owner when the infringement or violation of the content has ceased.

Although the above embodiments describe preferred embodiments as a system for searching and locating uses of data files, it is to be understood that other variations of uses of embodiments of this in disclosure can be implemented. For instance, in some preferred embodiments, the system can track questionable images. For example, a law enforcement agency can submit an image to the data management system for searching, including any information regarding the file known to the agency. The data management system searches its database for files that have similar file characteristics as the file in question utilizing a variety of methods, including, the fingerprinting method described above.

If a perceived match is found, the data management system allows the agency to view the file that has an exact match or files that have similar characteristics. When the agency identifies the image under investigation, the data management system can display historical information regarding the file, if any exists, and can further amend the file information with the agency's information. If a match is not found, a new file identification number will be generated and the file is submitted into the data management system for future searches.

In another embodiment, the agency can request to receive notification of any file activity. For example, if a search is conducted and a match is found, when additional information is added to the file, and the like. The notification is forwarded automatically via email or any other designated means to the requesting agency.

The variations of use of the data management system extend far beyond the simple detecting of file use. For instance, the system can be stored on a stand alone media, such as a CD ROM, and transported and used on stand alone computers, secured networks and the like. Indeed, such use of the data management system includes all forms of tracking the file data, and the disclosure it is intended to include other preferred embodiments encompassing other tracking or use variations. As such, the foregoing embodiments are intended as illustrative and the disclosure is intended to cover all modifications and alternative constructions falling within the spirit and scope of the disclosure.

What is claimed is:

1. A data management system, comprising:
   a data management server system that receives a video source file for registration and a target file for comparison with the video source file, the video source file including at least one index frame each having a plurality of red-green-blue (RGB) data values and each comprising a pixel matrix of source pixel elements, each of the source pixel elements being associated with a pixel color value;
   a key generation system that generates a key for the video source file by identifying a predetermined number of source elements in a selected index frame of the video source file as first source elements, each source element defining a pixel submatrix within the pixel matrix;
   a source print generation system that
      applies said key to the video source file to extract the first source elements from the selected index frame in accordance with said key, each of first source elements comprising the source pixel elements in the selected index frame that correspond with the pixel submatrix of a relevant key element,
      determines an average source pixel color value for each of said first source elements of the selected index frame to form a file fingerprint, said average source pixel color value comprising an average value of the pixel color values of the source pixel elements included in a relevant frame submatrix,
   a data embedding system that embeds an information block into the video source file, said information block including information pertaining to ownership of intellectual property rights;
   a database system that stores the video source file with the embedded information block, said key, the first source elements, the file fingerprint, and ownership information of the video source file; and
   a source print detection system that automatedly searches one or more portions of the target file for the occurrence of one or more first source elements in accordance with said key and that assigns a probability matching level to the target file,
   wherein, if said probability matching level is greater than a predetermined matching threshold, the data management system accesses said ownership information to notify an owner of the video source file.

2. The system of claim 1, wherein said database system is at least partially incorporated with said data management server system.

3. The system of claim 1, wherein said source print generation system extracts the first source elements being defined by element characteristics selected from the group consisting of an element size, an element start position, and an element initial position relative to said element start position.

4. The system of claim 1, wherein said information block includes user-defined information.

5. The system of claim 4, wherein said user-defined information is at least partially encrypted.

6. The system of claim 1, wherein said information block includes information selected from the group consisting of copyright information, trademark information, licensing information, mandatory compliance information, authorized user information, authorized website information, a file description, and at least one file attribute.

7. The system of claim 6, wherein said mandatory compliance information includes information selected from the group consisting of identification information, age information, custodial information, and other mandatory information required by law for image data.

8. The system of claim 1, wherein said data management system is in communication with at least one external computer system.

9. The system of claim 8, wherein said data management server system provides the video source file with said embedded information block to authorized users associated with one or more of the at least one external computer system.

10. The system of claim 8, wherein said source print detection system includes a search member that searches one or more of the at least one external computer system for target files to be compared with the video source file.

11. A method for managing data, comprising:
   receiving a video source file for registration, the video source file including at least one index frame each having a plurality of red-green-blue (RGB) data values and each comprising a pixel matrix of source pixel elements, each of the source pixel elements being associated with a pixel color value;
   generating a key for the video source file by identifying a predetermined number of source elements in a selected index frame of the video source file as first source elements, each source element defining a pixel submatrix within the pixel matrix;

applying said key to the video source file;

extracting the first source elements from the selected index frame in accordance with said key, each of first source elements comprising the source pixel elements in the selected index frame that correspond with the pixel submatrix of a relevant key element;

determining an average source pixel color value for each of said first source elements of the selected index frame to form a file fingerprint, said average source pixel color value comprising an average value of the pixel color values of the source pixel elements included in a relevant frame submatrix;

embedding an information block into the video source file, said information block including information pertaining to ownership intellectual property rights;

storing the video source file with the embedded information block, said key, the first source elements, the file fingerprint, and ownership information of the video source file;

receiving a target file for comparison with the video source file;

automatedly searching one or more portions of the target file for the occurrence of one or more first source elements in accordance with said key;

assigning a probability matching level to the target file; and if said probability matching level is greater than a predetermined matching threshold,
  accessing said ownership information to notify an owner of the video source file.

12. The method of claim 11, wherein said generating said key includes providing at least one data parameter associated with a selected characteristic of said key and incorporating said at least one data parameter into said key.

13. The method of claim 12, wherein said providing said at least one data parameter includes providing said at least one parameter selected from the group consisting of a predetermined number of source elements, an element size, an element start position, an element initial position relative to said element start position, an element type, and an element length.

14. The method of claim 11, wherein said extracting the source elements includes extracting the source elements from the video source file having data in a compressed format.

15. The method of claim 14, wherein said extracting the source elements includes expanding the data of the video source file.

16. The method of claim 11, wherein said extracting the source elements includes forming a concatenated string of the source elements.

17. The method of claim 11, wherein said extracting the source elements includes normalizing data of the video source file and extracting the normalized data from the video source file.

18. The method of claim 11, wherein said embedding said information block includes at least partially encrypting said information block.

19. The method of claim 11, wherein said receiving said source file includes communicating with an external computer system.

20. The method of claim 19, further comprising searching one or more of the at least external computer system for target files to be compared with the video source file.

21. The method of claim 19, further comprising providing the video source file with said embedded information block to authorized users associated with one or more of the at least one external computer system.

22. The method of claim 11, wherein said extracting the first source elements comprises extracting the first source elements from the video source file via compression specific element extraction.

23. A computer program product for managing data, the computer program product being encoded on one or more non-transitory machine-readable storage media and comprising:

instruction for receiving a video source file for registration, the video source file including at least one index frame each having a plurality of red-green-blue (RGB) data values and each comprising a pixel matrix of source pixel elements, each of the source pixel elements being associated with a pixel color value;

instruction for generating a key for the video source file by identifying a predetermined number of source elements in a selected index frame of the video source file as first source elements, each source element defining a pixel submatrix within the pixel matrix;

instruction for applying said key to the video source file;

instruction for extracting the first source elements from the selected index frame in accordance with said key, each of first source elements comprising the source pixel elements in the selected index frame that correspond with the pixel submatrix of a relevant key element;

instruction for determining an average source pixel color value for each of said first source elements of the selected index frame to form a file fingerprint, said average source pixel color value comprising an average value of the pixel color values of the source pixel elements included in a relevant frame submatrix;

instruction for embedding an information block into the video source file, said information block including information pertaining to ownership intellectual property rights;

instruction for storing the video source file with the embedded information block, said key, the first source elements, the file fingerprint, and ownership information of the video source file;

instruction for receiving a target file for comparison with the video source file;

instruction for automatedly searching one or more portions of the target file for the occurrence of one or more first source elements in accordance with said key;

instruction for assigning a probability matching level to the target file; and instruction for, if said probability matching level is greater than a predetermined matching threshold, accessing said ownership information to notify an owner of the video source file.

* * * * *